(12) United States Patent
Suzuki et al.

(10) Patent No.: US 10,281,182 B2
(45) Date of Patent: May 7, 2019

(54) REFRIGERATION CYCLE APPARATUS, METHOD OF MANUFACTURING THE SAME, AND METHOD OF INSTALLING THE SAME

(71) Applicant: Mitsubishi Electric Corporation, Tokyo (JP)

(72) Inventors: Yasuhiro Suzuki, Tokyo (JP); Akiyoshi Ishibashi, Tokyo (JP); Noriaki Imano, Tokyo (JP); Kazuki Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 138 days.

(21) Appl. No.: 14/917,971

(22) PCT Filed: Sep. 4, 2014

(86) PCT No.: PCT/JP2014/073364
§ 371 (c)(1),
(2) Date: Mar. 10, 2016

(87) PCT Pub. No.: WO2015/068455
PCT Pub. Date: May 14, 2015

(65) Prior Publication Data
US 2016/0216018 A1    Jul. 28, 2016

(30) Foreign Application Priority Data

Nov. 8, 2013   (JP) ................. 2013-232189

(51) Int. Cl.
*F25B 13/00*        (2006.01)
*F25B 45/00*        (2006.01)
(Continued)

(52) U.S. Cl.
CPC ............ *F25B 45/00* (2013.01); *F25B 43/043* (2013.01); *G01M 3/223* (2013.01);
(Continued)

(58) Field of Classification Search
CPC .. F25B 45/00; F25B 43/043; F25B 2400/121; F25B 13/00; G01M 3/223; G01M 3/3227; Y02P 80/156; Y10T 29/49359
See application file for complete search history.

(56) References Cited

U.S. PATENT DOCUMENTS

2011/0219794 A1   9/2011   Shiba
2015/0209920 A1   7/2015   Shiba

FOREIGN PATENT DOCUMENTS

CN    102052810 A    5/2011
CN    202119019 U    1/2012
(Continued)

OTHER PUBLICATIONS

Office Action dated Apr. 26, 2017 issued in corresponding AU patent application No. 2014345151.
(Continued)

*Primary Examiner* — Sarang Afzali
*Assistant Examiner* — Ruth G Hidalgo-Hernandez
(74) *Attorney, Agent, or Firm* — Posz Law Group, PLC

(57) ABSTRACT

A method of manufacturing an air-conditioning apparatus serving as a refrigeration cycle apparatus includes: performing an operation test in a factory under a state in which inert gas (nitrogen) is sealed into respective devices mounted on an outdoor unit (such as a compressor and a four-way valve) and an outdoor pipe connecting the devices in place of refrigerant having flammability; and shipping the air-conditioning apparatus under the state in which the inert gas remains sealed.

2 Claims, 5 Drawing Sheets

(51) Int. Cl.
*G01M 3/32* (2006.01)
*F25B 43/04* (2006.01)
*G01M 3/22* (2006.01)

(52) U.S. Cl.
CPC ........... *G01M 3/3227* (2013.01); *F25B 13/00* (2013.01); *F25B 2400/121* (2013.01); *Y02P 80/156* (2015.11); *Y10T 29/49359* (2015.01)

(56) References Cited

FOREIGN PATENT DOCUMENTS

| | | | |
|---|---|---|---|
| CN | 204240628 U | | 4/2015 |
| EP | 0936417 A2 | | 8/1999 |
| EP | 2317253 A2 | | 5/2011 |
| JP | H08261607 A | * | 3/1995 |
| JP | 07-190575 A | | 7/1995 |
| JP | H07190575 A | * | 7/1995 |
| JP | 08-261607 A | | 10/1996 |
| JP | 09-113074 A | | 5/1997 |
| JP | 09-229522 A | | 9/1997 |
| JP | 10-122710 A | | 5/1998 |
| JP | 2011-047556 A | | 3/2011 |
| JP | 2011-094871 A | | 5/2011 |

OTHER PUBLICATIONS

Office Action dated Mar. 2, 2017 issued in the corresponding CN patent application No. 201410638405.8 (with English translation).
International Search Report of the International Searching Authority dated Dec. 16, 2014 for the corresponding international application No. PCT/JP2014/073364 (and English translation).
Decision of Refusal dated May 12, 2015 in the corresponding JP application No. 2013-232189 (and English translation).
Notice of Reasons for Rejection dated Dec. 9, 2014 in the corresponding JP application No. 2013-232189 (and English translation).
Office Action dated Jul. 27, 2017 issued in corresponding AU patent application No. 2014345151.
Extended European Search Report dated Aug. 8, 2017 issued in corresponding EP application No. 14860463.0.
Office Action dated Jul. 5, 2016 issued in corresponding CN patent application No. 201410638405.8 (and partial English translation).
Office action dated Feb. 27, 2019 issued in corresponding Indian patent application No. 201647017828 (and English translation thereof).

* cited by examiner

REFRIGERATION CYCLE APPARATUS, METHOD OF MANUFACTURING THE SAME, AND METHOD OF INSTALLING THE SAME

CROSS REFERENCE TO RELATED APPLICATIONS

This application is a U.S. national stage application of International Application No. PCT/JP2014/073364 filed on Sep. 4, 2014, which is based on and claims priority to Japanese Patent Application No. 2013-232189 filed on Nov. 8, 2013, the disclosures of which are incorporated herein by reference.

TECHNICAL FIELD

The present invention relates to a refrigeration cycle apparatus, a method of manufacturing the refrigeration cycle apparatus, and a method of installing the refrigeration cycle apparatus, and more particularly, to a refrigeration cycle apparatus for executing a refrigeration cycle using refrigerant having low global warming potential, a method of manufacturing the refrigeration cycle apparatus, and a method of installing the refrigeration cycle apparatus.

BACKGROUND ART

Hitherto, a nonflammable "HFC refrigerant" such as R410A is used as refrigerant for refrigeration cycle apparatus. Unlike a related-art "HCFC refrigerant" such as R22, R410A has an ozone depletion potential (hereinafter referred to as "ODP") of zero and hence does not deplete an ozone layer. However, R410A has a property of high global warming potential (hereinafter referred to as "GWP").

Thus, as a part of prevention of global warming, consideration has been made to replace the HFC refrigerant having high GWP, such as R410A, with refrigerant having low GWR As a candidate for such refrigerant having low GWP, there is given a HC refrigerant such as R290 ($C_3H_8$; propane) and R1270 ($C_3H_6$; propylene), which are natural refrigerants. However, unlike nonflammable R410A, the HC refrigerant has flammability at a strongly flammable level, and hence caution is required for refrigerant leakage.

Further, as another candidate for the refrigerant having low GWP, there is given a HFC refrigerant having no carbon-carbon double bond in a composition thereof, such as R32 ($CH_2F_2$; difluoromethane) having GWP lower than R410A.

Further as a similar refrigerant candidate, there is given a halogenated hydrocarbon having a carbon-carbon double bond in a composition thereof, which is a kind of the HFC refrigerant similarly to R32. As such a halogenated hydrocarbon, there are given, for example, HFO-1234yf ($CF_3CF=CH_2$; tetrafluoropropene) and HFO-1234ze ($CF_3$—$CH=CHF$). Note that, to distinguish the HFC refrigerant having a carbon-carbon double bond in a composition thereof from the HFC refrigerant having no carbon-carbon double bond in a composition thereof, such as R32, the HFC refrigerant having a carbon-carbon double bond in a composition thereof is expressed as "HFO" through use of "O" of an olefin (unsaturated hydrocarbon having a carbon-carbon double bond is called an olefin) in most cases.

The above-mentioned HFC refrigerant (including the HFO refrigerant) having low GWP is not as strongly flammable as the HC refrigerant such as R290 ($C_3H_8$; propane), which is a natural refrigerant, but the HFC refrigerant (including the HFO refrigerant) having low GWP has flammability at a slightly flammable level unlike nonflammable R410A. Consequently, similarly to R290, caution is required for refrigerant leakage. Refrigerant having flammability is hereinafter referred to as "flammable refrigerant" even when the flammability is at a slightly flammable level.

When those kinds of flammable refrigerant are used, it is necessary to secure safety from possible refrigerant leakage not only during the use of the refrigeration cycle apparatus (during the operation of the refrigeration cycle apparatus) but also during the steps of manufacturing, shipping, storing, and transporting the refrigeration cycle apparatus. There are proposed a great variety of technologies for securing the safety during the use of the refrigeration cycle apparatus (during the operation of the refrigeration cycle apparatus). On the other hand, there are only a few proposals for technologies that may be applied to the steps of manufacturing, shipping, storing, and transporting the refrigeration cycle apparatus. Under those circumstances, there is disclosed a refrigerating and air-conditioning apparatus to be shipped under a state in which nonflammable refrigerant is newly sealed (see, for example, Patent Literature 1).

CITATION LIST

Patent Literature

Patent Literature 1: Japanese Unexamined Patent Application Publication No. 2011-94871 (pages 8-9, FIG. 7)

SUMMARY OF INVENTION

Technical Problem

Manufacturing steps for the refrigerating and air-conditioning apparatus disclosed in Patent Literature 1 (hereinafter referred to as "refrigeration cycle apparatus") are as follows.

That is, a refrigerant circuit of the refrigeration cycle is constructed, and then flammable refrigerant A, which is designated refrigerant for the refrigerant circuit, is temporarily sealed. In this state, test operation and inspection are performed. After that, the flammable refrigerant A is recovered, and nonflammable refrigerant B is newly sealed. In this state, the refrigeration cycle apparatus is shipped and stored. When the refrigeration cycle apparatus is then installed, the flammable refrigerant A, which is the designated refrigerant, is additionally sealed without recovering the nonflammable refrigerant B.

Thus, even in the event of refrigerant leakage during the steps of, for example, manufacturing, shipping, storing, and transporting the refrigeration cycle apparatus, the safety can be secured because the leaked refrigerant is the nonflammable refrigerant B.

Further, the nonflammable refrigerant B sealed at the time of shipping the refrigeration cycle apparatus is not recovered at the site. Thus, a "HFC refrigerant such as R410A and R407C" or a "natural refrigerant such as $CO_2$" that enables use of latent heat due to phase transition caused under pressure conditions of the refrigerant circulating through the refrigerant circuit during the operation of the refrigeration cycle apparatus is desired as the nonflammable refrigerant B, whereas an "inert gas such as nitrogen, helium, and argon that is not subjected to phase transition" is inappropriate as the nonflammable refrigerant B.

However, the refrigeration cycle apparatus disclosed in Patent Literature 1 has the following problems because the refrigeration cycle apparatus is manufactured, shipped, stored, and installed through the above-mentioned steps.

(a) In the factory, facilities for sealing and recovering the flammable refrigerant A that is used at the time of manufacturing the refrigeration cycle apparatus but is not sealed at the time of shipping the refrigeration cycle apparatus are required, and a factory site and a building for installing the facilities are also required, thereby increasing the investment amount. As a result, the manufacturing cost is also increased.

(b) The HFC refrigerant having high GWP, such as R410A and R407C, is used as the nonflammable refrigerant B, and hence, in the event of leakage, adverse effects to exacerbate global warming are inevitable.

(c) The refrigerant kinds are different between the nonflammable refrigerant B sealed in advance in the factory and the flammable refrigerant A additionally sealed at the site, and hence the refrigerant to be recovered at the time of repairing or dismantling the refrigeration cycle apparatus (hereinafter referred to as "refrigerant to be recovered") is a mixture. Consequently, components forming the refrigerant to be recovered vary widely, and the ratio of the respective components varies widely as well. As a result, processing of the refrigerant to be recovered (such as destruction and recycling) cannot be executed properly and efficiently.

The present invention has been made to solve the problems as described above, and has the following objects.

(i) To provide a refrigeration cycle apparatus, a method of manufacturing the refrigeration cycle apparatus, and a method of installing the refrigeration cycle apparatus, which are reduced in investment amount for facilities and in manufacturing cost, and have no risk of fire even in the event of leakage of a medium sealed at the time of manufacturing, shipping, transporting, storing, and installing the refrigeration cycle apparatus, and no risk of adverse effects to exacerbate global warming and ozone depletion despite the fact that the refrigeration cycle apparatus executes a refrigeration cycle using refrigerant having flammability.

(ii) To provide a refrigeration cycle apparatus, a method of manufacturing the refrigeration cycle apparatus, and a method of installing the refrigeration cycle apparatus, which enable recovery of a single kind of refrigerant instead of a mixture at the time of repairing or dismantling the refrigeration cycle apparatus, and also enable subsequent processing (such as destruction and recycling) to be executed properly and efficiently.

(iii) To provide a refrigeration cycle apparatus, a method of manufacturing the refrigeration cycle apparatus, and a method of installing the refrigeration cycle apparatus, which are capable of achieving reduction in load on installation work and resource saving in the installation work through good use of a medium, which is sealed at the time of shipping the refrigeration cycle apparatus from a factory, in an airtightness test for confirming the airtightness of a refrigerant circuit at the time of installing the refrigeration cycle apparatus.

Solution to Problem

According to the present invention, there is provided a refrigeration cycle apparatus for executing a refrigeration cycle using refrigerant having flammability, the refrigeration cycle apparatus being subjected to an operation test performed in a factory under a state in which inert gas is sealed into devices of the refrigeration cycle apparatus for executing the refrigeration cycle and a pipe connecting the devices, and the refrigeration cycle apparatus being shipped under the state in which the inert gas remains sealed.

Advantageous Effects of Invention

The refrigeration cycle apparatus according to the present invention is subjected to the operation test performed in the factory under the state in which the inert gas is sealed into the refrigerant circuit (identical with the devices for executing the refrigeration cycle and the pipe connecting the devices) in place of the refrigerant having flammability, and the refrigeration cycle apparatus is shipped under the state in which the inert gas remains sealed. Thus, the manufacture, operation test, and shipment are performed without ever using the refrigerant having flammability in the factory, and hence the following effects are attained.

(i) There is no need to seal and recover the refrigerant having flammability in the factory, thereby requiring no facilities, factory site, or building for sealing and recovering the refrigerant. As a result, the investment amount and the manufacturing cost are reduced.

(ii) The refrigeration cycle apparatus is shipped under the state in which the inert gas is sealed, and hence there is no risk of fire or environmental impact (adverse effects to exacerbate global warming and ozone depletion) even in the event of leakage of the inert gas at the time of storing and transporting the refrigeration cycle apparatus after the shipment.

(iii) Further, the airtightness test for the refrigerant circuit (respective devices and pipe connecting the devices) can be performed at the time of installing the refrigeration cycle apparatus through use of the inert gas remaining sealed when the refrigeration cycle apparatus is shipped. Thus, the reduction in work load and the resource saving in the installation work can be achieved by performing the airtightness test through use of the inert gas.

DESCRIPTION OF EMBODIMENTS

[Embodiment 1]

Figure 1:
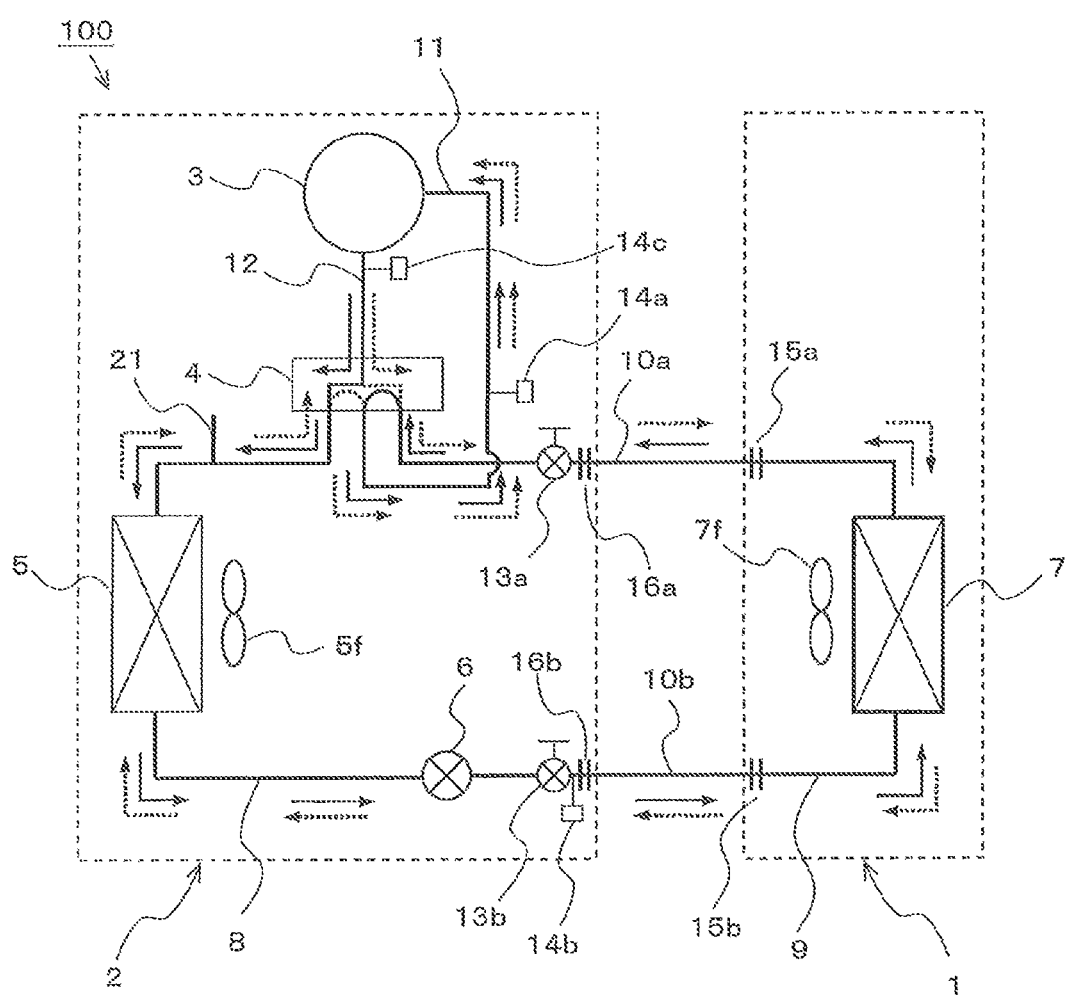
FIG. 1 is a refrigerant circuit diagram illustrating a configuration of a refrigeration cycle apparatus (air-conditioning apparatus) according to Embodiment 1 of the present invention.
Figure 2:
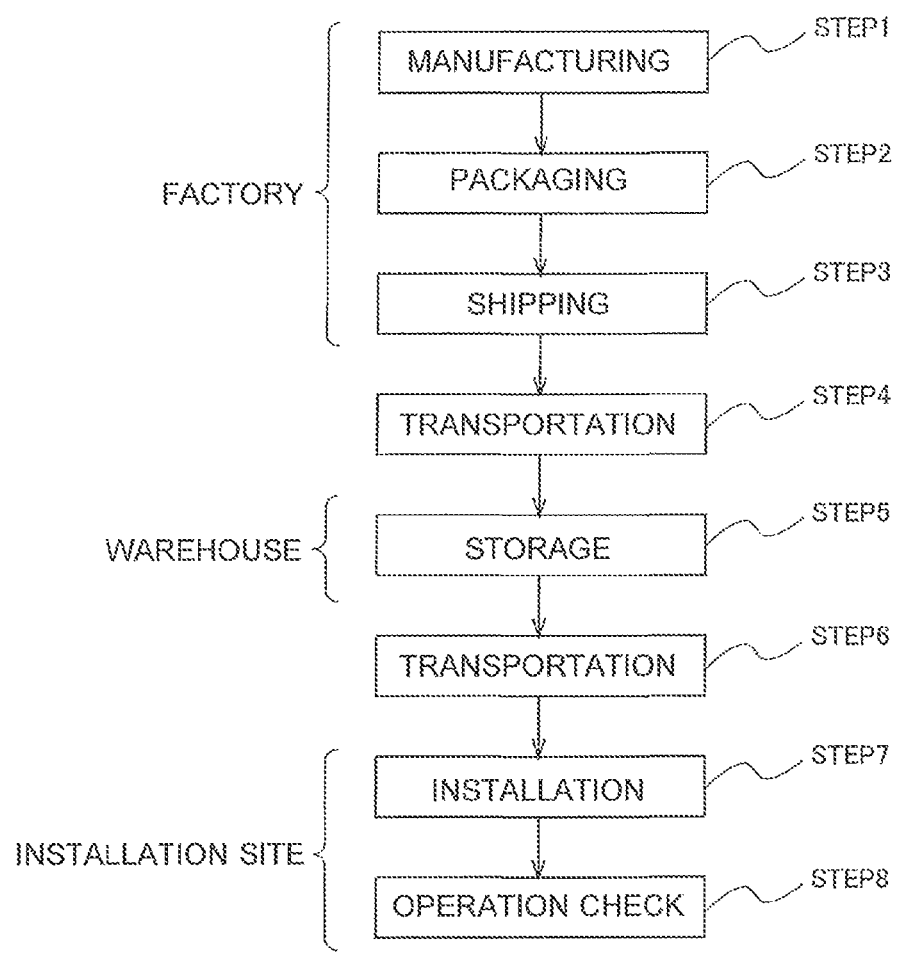
FIG. 2 is a flow chart illustrating steps in the process from manufacture of the refrigeration cycle apparatus (air-conditioning apparatus) up to use of the refrigeration cycle apparatus (air-conditioning apparatus) by a user according to Embodiment 1 of the present invention.

FIG. 1 and FIG. 2 are illustrations of a refrigeration cycle apparatus according to Embodiment 1 of the present invention. FIG. 1 is a refrigerant circuit diagram illustrating a configuration of the refrigeration cycle apparatus, and FIG. 2 is a flow chart illustrating steps in the process from manufacture of the refrigeration cycle apparatus up to use of the refrigeration cycle apparatus by a user.

In FIG. 1, an air-conditioning apparatus 100 serving as the refrigeration cycle apparatus is a separate type including an indoor unit (same as a use-side unit) 1 to be installed indoors, an outdoor unit (same as a heat source-side unit) 2 to be installed outdoors, and extension pipes 10a and 10b for coupling the indoor unit 1 and the outdoor unit 2 to each other.

(Refrigerant Circuit of Outdoor Unit)

The outdoor unit 2 includes a compressor 3 for compressing and discharging refrigerant, a refrigerant flow switching valve (hereinafter referred to as "four-way valve") 4 for switching a flow direction of refrigerant in the refrigerant circuit between a cooling operation and a heating operation, an outdoor heat exchanger 5 serving as a heat source-side heat exchanger for exchanging heat between outdoor air and refrigerant, and a pressure reducing device (hereinafter referred to as "expansion valve") 6 serving as an expansion unit such as an electronically controlled expansion valve for reducing a pressure of refrigerant from a high pressure to a low pressure with a changeable opening degree. Those components are coupled to each other through an outdoor pipe (same as a heat source-side refrigerant pipe) 8.

Further, an outdoor air-sending device 5f for supplying (blowing) outdoor air to the outdoor heat exchanger 5 is set to be opposed to the outdoor heat exchanger 5. An air flow passing through the outdoor heat exchanger 5 is generated by rotating the outdoor air-sending device 5f. The outdoor unit 2 uses a propeller fan as the outdoor air-sending device 5f, and the propeller fan is arranged on a downstream side of the outdoor heat exchanger 5 (downstream side of the air flow generated by the outdoor air-sending device 5f) to suck outdoor air passing through the outdoor heat exchanger 5.

(Outdoor Pipe)

The outdoor pipe 8 refers to a refrigerant pipe for coupling an extension pipe connection valve 13a on a gas side (during the cooling operation) and the four-way valve 4 to each other, a suction pipe 11, a discharge pipe 12, a refrigerant pipe for coupling the four-way valve 4 and the outdoor heat exchanger (same as the heat source-side heat exchanger) 5 to each other, a refrigerant pipe for coupling the outdoor heat exchanger 5 and the expansion valve 6 to each other, and a refrigerant pipe for coupling the expansion valve 6 and an extension pipe connection valve 13b on a liquid side (during the cooling operation) to each other. Those pipes are collectively referred to as "outdoor pipe 8".

(Extension Pipe Connection Valve)

The extension pipe connection valve 13a on the gas side is arranged in a connection portion of the outdoor pipe 8 to the extension pipe 10a on the gas side, whereas the extension pipe connection valve 13b on the liquid side is arranged in a connection portion of the outdoor pipe 8 to the extension pipe 10b on the liquid side. The extension pipe connection valve 13a on the gas side is a two-way valve switchable to be opened or closed, and a flare joint 16a is mounted on one end of the extension pipe connection valve 13a on the gas side.

Further, the extension pipe connection valve 13b on the liquid side is a three-way valve switchable to be opened or closed, and a service port 14b to be used for evacuation (during work before supply of refrigerant to the air-conditioning apparatus 100) and a flare joint 16b are mounted on the extension pipe connection valve 13b on the liquid side.

Then, a male screw is formed on each outdoor pipe 8 side of the flare joints 16a and 16b mounted on the extension pipe connection valves 13a and 13b (also including the service port 14b). A flare nut (not shown) having a female screw to be threadingly engaged with the male screw at the time of shipping the outdoor unit 2 (including the shipment of the air-conditioning apparatus 100) is mounted on the male screw.

(Service Port)

Note that, for convenience of the description below, in the outdoor pipe 8, a range connecting the compressor 3 to an inlet of the four-way valve 4 on a discharge side of the compressor 3 is referred to as the discharge pipe 12, and a range connecting the four-way valve 4 to the compressor 3 on a suction side of the compressor 3 is referred to as the suction pipe 11.

Thus, in any of the cooling operation (operation for supplying low-temperature and low-pressure refrigerant to an indoor heat exchanger 7) or the heating operation (operation for supplying high-temperature and high-pressure refrigerant to the indoor heat exchanger 7), the high-temperature and high-pressure gas refrigerant compressed by the compressor 3 constantly flows into the discharge pipe 12, and the low-temperature and low-pressure refrigerant subjected to an evaporation function flows into the suction pipe 11.

The low-temperature and low-pressure refrigerant flowing through the suction pipe 11 is sometimes in the form of gas refrigerant and sometimes in a two phase state. A service port 14a with a flare joint on a low-pressure side is formed in the suction pipe 11, and a service port 14c with a flare joint on a high-pressure side is formed in the discharge pipe 12. The service ports 14a and 14c are used for connecting pressure gauges thereto during test operation at the time of installation or repair so that an operation pressure is measured.

Note that, a male screw is formed on each flare joint (not shown) of the service ports 14a and 14c, and a flare nut (not shown) having a female screw to be threadingly engaged with the male screw at the time of shipping the outdoor unit 2 (including the shipment of the air-conditioning apparatus 100) is mounted on the male screw.

(Refrigerant Circuit of Indoor Unit)

The indoor unit 1 includes the indoor heat exchanger 7 serving as a use-side heat exchanger for exchanging heat between indoor air and refrigerant. An indoor pipe (same as a use-side refrigerant pipe) 9 is connected to the indoor heat exchanger 7.

A flare joint 15a for connecting the extension pipe 10a on the gas side is arranged in a connection portion of the indoor pipe 9 to the extension pipe 10a on the gas side, whereas a flare joint 15b for connecting the extension pipe 10b on the liquid side is arranged in a connection portion of the indoor pipe 9 to the extension pipe 10b on the liquid side.

The flare joints 15a and 15b respectively have a male screw formed thereon, and a flare nut (not shown) having a female screw to be threadingly engaged with the male screw at the time of shipping the indoor unit 1 (including the shipment of the air-conditioning apparatus 100) is mounted on the male screw.

Further, an indoor air-sending device 7f is set to be opposed to the indoor heat exchanger 7, and an air flow passing through the indoor heat exchanger 7 is generated by rotating the indoor air-sending device 7f. Note that, as the indoor air-sending device 7f, various fans such as a cross flow fan and a turbo fan are adopted depending on the form of the indoor unit 1. Further, the indoor air-sending device 7f may be positioned on a downstream side or an upstream side of the indoor heat exchanger 7 in the air flow generated by the indoor air-sending device 7f.

(Refrigerant Circui of Air-Conditioning Apparatus)

Each end of the extension pipe 10a on the gas side is connected removably to a corresponding one of the flare joint 16a mounted on the extension pipe connection valve 13a on the gas side of the outdoor unit 2 and the flare joint 15a mounted on the indoor pipe 9 of the indoor unit 1, whereas each end of the extension pipe 10b on the liquid side is connected removably to a corresponding one of the flare joint 16b mounted on the extension pipe connection valve 13b on the liquid side of the outdoor unit 2 and the flare joint 15b mounted on the indoor pipe 9 of the indoor unit 1.

That is, the outdoor pipe 8 and the indoor pipe 9 are connected through the extension pipes 10a and 10b to form the continuous refrigerant circuit, thereby being capable of executing a compression type heat pump cycle for circulating the refrigerant compressed by the compressor 3.

(Refrigerant Flow During Cooling Operation)

In FIG. 1, the solid arrows denote a flow direction of the refrigerant during the cooling operation. In the cooling operation, the four-way valve 4 is switched to the refrigerant circuit denoted by the solid line, and the high-temperature and high-pressure gas refrigerant discharged from the compressor 3 passes through the four-way valve 4 to first flow into the outdoor heat exchanger 5. At this time, the outdoor heat exchanger 5 serves as a condenser.

That is, when the air flow generated through the rotation of the outdoor air-sending device 5f passes through the outdoor heat exchanger 5, the outdoor air passing through the outdoor heat exchanger 5 and the refrigerant flowing through the outdoor heat exchanger 5 exchange heat, and condensation heat of the refrigerant is supplied to the outdoor air. Thus, the refrigerant is condensed in the outdoor heat exchanger 5 to turn into high-pressure and intermediate-temperature liquid refrigerant.

Next, the high-pressure and intermediate-temperature liquid refrigerant flows into the expansion valve 6 and is subjected to adiabatic expansion in the expansion valve 6 to turn into low-pressure and low-temperature two-phase refrigerant.

Subsequently, the low-pressure and low-temperature two-phase refrigerant is supplied to the indoor unit 1 through the extension pipe 10b on the liquid side and flows into the indoor heat exchanger 7. The indoor heat exchanger 7 serves as an evaporator. That is, when the indoor air flow generated through the rotation of the indoor air-sending device 7f passes through the indoor heat exchanger 7, the indoor air passing through the indoor heat exchanger 7 and the refrigerant flowing through the indoor heat exchanger 7 exchange heat, and the refrigerant is evaporated by taking away evaporation heat (heating energy) from the indoor air to turn into low-temperature and low-pressure gas refrigerant or refrigerant in a two-phase state. On the other hand, the indoor air passing through the indoor heat exchanger 7 is cooled by taking away cooling energy from the refrigerant, to thereby cool indoors.

Further, the refrigerant, which is turned into the low-temperature and low-pressure gas refrigerant or the refrigerant in a two-phase state through evaporation in the indoor heat exchanger 7, is supplied to the outdoor unit 2 through the extension pipe 10a on the gas side and sucked into the compressor 3 through the four-way valve 4. Then, the low-temperature and low-pressure gas refrigerant or the refrigerant in a two-phase state is compressed into high-temperature and high-pressure gas refrigerant again by the compressor 3. In the cooling operation, this cycle is repeated.

(Refrigerant Flow During Heating Operation)

In FIG. 1, the dotted arrows denote a flow direction of the refrigerant during the heating operation. When the four-way valve 4 is switched to the refrigerant circuit denoted by the dotted line, the refrigerant flows in a direction opposite to that during the cooling operation and first flows into the indoor heat exchanger 7. By operating the indoor heat exchanger 7 as a condenser and operating the outdoor heat exchanger 5 as an evaporator, condensation heat (heating energy) is supplied to the indoor air passing through the indoor heat exchanger 7 to heat the indoor air, thereby performing the heating operation.

(Refrigerant)

In the air-conditioning apparatus 100, as the refrigerant flowing through the refrigerant circuit (hereinafter referred to as "designated refrigerant"), R32 ($CH_2F_2$; difluoromethane) is used. R32 is a HFC refrigerant that has slight flammability and relatively less influence on global warming due to GWP lower than that of HFC refrigerant R410A, which is currently used widely in air-conditioning apparatus.

Note that, the refrigerant is not limited to R32 and may be, for example, a HFO refrigerant, such as HFO-1234yf ($CF_3CF{=}CH_2$; tetrafluoropropene) and HFO-1234ze ($CF_3{-}CH{=}CHF$), which is a halogenated hydrocarbon having a carbon-carbon double bond in a composition thereof as a kind of the above-mentioned HFC refrigerant having slight flammability similarly to R32, and has GWP further lower than the R32 refrigerant.

Further, the refrigerant may be a HC refrigerant having strong flammability, such as R290 ($C_3H_8$; propane) and R1270 ($C_3H_6$; propylene). Further, the refrigerant may be a mixed refrigerant containing two or more kinds of those refrigerants.

(Inert Gas)

In a factory, nitrogen ($N_2$) is sealed into the refrigerant circuit (outdoor pipe 8) of the outdoor unit 2 of the air-conditioning apparatus 100 under a state of an atmospheric pressure or more, and then an operation test is performed. In this state, the air-conditioning apparatus 100 is shipped, stored, and transported. When the air-conditioning apparatus 100 is then installed at a site, an airtightness test is performed through use of the sealed nitrogen. Further, the nitrogen is discharged and designated refrigerant is sealed into the refrigerant circuit (outdoor pipe 8, indoor pipe 9, extension pipes 10a and 10b, and other pipes) (to be described separately in detail).

Note that, nitrogen available at low cost is given as an inert gas to be sealed at the time of shipping the outdoor unit 2, but the present invention is not limited to nitrogen. Inert gases such as helium (He), argon (Ar), and carbon dioxide ($CO_2$) may be used instead.

(Steps in Process From Manufacture of Refrigeration Cycle Apparatus up to Use of Refrigeration Cycle Apparatus by User)

In FIG. 2, the air-conditioning apparatus 100 is involved with the following steps in the process from manufacture of the air-conditioning apparatus 100 up to use of the air-conditioning apparatus 100 by a user.

That is, STEP 1 is a manufacturing step for manufacturing the air-conditioning apparatus 100 in a factory. STEP 2 is a packaging step for packaging the manufactured air-conditioning apparatus 100, STEP 3 is a shipping step for shipping the air-conditioning apparatus 100 from the factory. STEP 4 is a transportation step for transporting the air-conditioning apparatus 100 from the factory to a warehouse. STEP 5 is a storage step for storing the air-conditioning apparatus 100 in the warehouse.

STEP 6 is a transportation step for transporting the air-conditioning apparatus 100 from the warehouse to a use place where a user uses the air-conditioning apparatus 100. STEP 7 is an installation step for installing the air-conditioning apparatus 100 at the use place. STEP 8 is an operation check step for actually operating the air-conditioning apparatus 100 to confirm no abnormality in the installed air-conditioning apparatus 100 and in the installation work. Note that, the respective steps are described separately in detail.

(Actions and Effects)

In the manufacturing step for the air-conditioning apparatus 100, designated refrigerant, which is flammable refrigerant, is never used but inert gas is used for the outdoor pipe 8 of the outdoor unit 2 or other components, and hence the following actions and effects are attained.

(i) There is no need to take a step of sealing and recovering flammable refrigerant, thereby requiring no facilities, factory site, or building for taking this step. As a result, the investment amount and the manufacturing cost are reduced.

(ii) The air-conditioning apparatus 100 is shipped under a state in which inert gas is sealed, and hence there is no risk of fire even in the event of leakage during the steps of manufacturing, shipping, storing, and transporting the air-conditioning apparatus 100. Further, there is no risk of adverse effects to exacerbate global warming and ozone depletion.

(iii) Further, even when the air-conditioning apparatus 100 is shipped under a state in which inert gas is sealed in place of designated refrigerant, corrosion in the refrigerant circuit can be prevented during the steps of manufacturing, shipping, storing, and transporting the air-conditioning apparatus 100. As a result, the reliability of the apparatus can be maintained.

(iv) The operation test is performed under a state in which inert gas is sealed at the time of manufacturing the air-conditioning apparatus 100, and hence it is confirmed that the operation of the air-conditioning apparatus 100 has no trouble. As a result, the reliability of the apparatus is guaranteed.

Note that, the above-mentioned actions and effects are described by taking the air-conditioning apparatus 100 as an example, but the present invention is not limited thereto. The present invention may also be applied to a "separate-type refrigeration cycle apparatus" such as a showcase having a continuous refrigerant circuit (refrigerant circuit in which refrigerant circulates) constructed by connecting a use-side unit corresponding to the indoor unit of the air-conditioning apparatus and a heat source-side unit corresponding to the outdoor unit of the air-conditioning apparatus through the extension pipes. In this case, actions and effects similar to those of the above can be attained.

[Embodiment 2]

Figure 3:
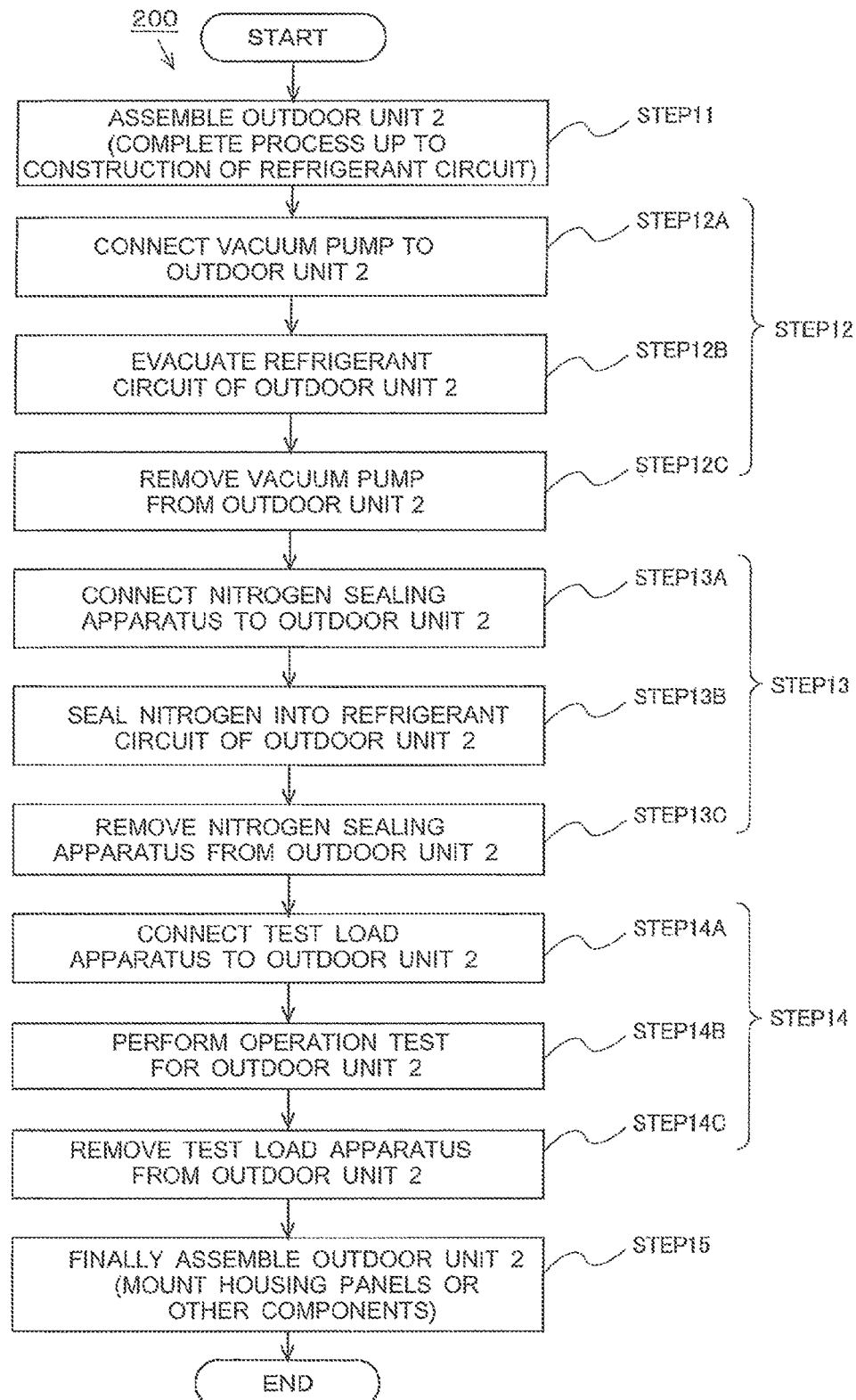
FIG. 3 is a flow chart illustrating a method of manufacturing a refrigeration cycle apparatus (air-conditioning apparatus) according to Embodiment 2 of the present invention.

FIG. 3 is a flow chart illustrating a method of manufacturing a refrigeration cycle apparatus according to Embodiment 2 of the present invention.

In FIG. 3, a method 200 of manufacturing a refrigeration cycle apparatus is a method of manufacturing the air-conditioning apparatus 100 (see Embodiment 1), and detailed steps involved in the manufacturing step for the outdoor unit 2 (STEP 1: see FIG. 2) are illustrated in FIG. 3. That is, STEP 11 is an assembling step for the outdoor unit constructing the refrigerant circuit, which is taken by connecting the respective devices of the outdoor unit 2 (compressor 3, four-way valve 4, outdoor heat exchanger 5, expansion valve 6, extension pipe connection valves 13*a* and 13*b*, and other devices) through the outdoor pipe 8.

Further, STEP 12 is an evacuation step for discharging air in the refrigerant circuit of the outdoor unit 2 to facilitate the sealing of nitrogen. STEP 13 is a nitrogen sealing step for sealing nitrogen into the refrigerant circuit of the outdoor unit 2. STEP 14 is a test-operation and inspection step for performing an operation test for the outdoor unit 2 through use of the sealed nitrogen. STEP 15 is a final assembling step for the outdoor unit 2 through mounting of housing panels (not shown) or other work.

(Assembling Step for Outdoor Unit)

As illustrated in FIG. 1, the refrigerant circuit of the outdoor unit 2 is constructed by connecting the compressor 3, the four-way valve 4, the outdoor heat exchanger 5, the expansion valve 6, the extension pipe connection valves 13*a* and 13*b*, and other devices through the outdoor pipe 8. Thus, STEP 11 is a final step for assembling the refrigerant circuit (at this time, the refrigerant circuit is not continuous).

(Evacuation Step)

STEP 12 is the evacuation step to be taken before nitrogen is sealed into the refrigerant circuit of the outdoor unit 2. Specifically, STEP 12 includes STEP 12A as a step of connecting a vacuum pump (not shown) to the outdoor unit 2, STEP 12B as a step of performing evacuation, and STEP 12C as a step of removing the vacuum pump from the outdoor unit 2.

In STEP 12A, there is adopted a method of connecting the vacuum pump to the outdoor unit 2 at the service ports 14*a* and 14*c*, or a method of mounting manufacturing joints (couplers) on a process pipe 21 mounted between the four-way valve 4 and the outdoor heat exchanger 5 of the outdoor pipe 8 and on the extension pipe connection valves 13*a* and 13*b* of the outdoor unit 2, and using the manufacturing joints as connection portions. To enhance the efficiency of the manufacturing step, the method of using one or a plurality of the manufacturing joints (couplers) as the connection portions is adopted in many cases.

Note that, to enhance the efficiency of the manufacturing step, the manufacturing joints (couplers) are mounted and removed through one-touch operation instead of screw fastening. Further, under a state in which the vacuum pump is mounted, the manufacturing joints (couplers) are brought into an opened state to enable the evacuation, whereas under a state in which the vacuum pump is removed, the manufacturing joints (couplers) are brought into a closed state to enable the vacuum to be maintained in the refrigerant circuit of the outdoor unit 2.

Further, when the extension pipe connection valves 13*a* and 13*b* having the manufacturing joints (couplers) mounted thereon are brought into an opened state, the refrigerant circuit of the outdoor unit 2 can be evacuated.

Until STEP 14C described later is completed, the manufacturing joints (couplers) mounted on the extension pipe connection valves 13*a* and 13*b* remain mounted, and the extension pipe connection valves 13*a* and 13*b* are maintained in the opened state. When STEP 14C is completed, the extension pipe connection valves 13*a* and 13*b* are closed (shut off).

(Nitrogen Sealing Step)

STEP 13 is the nitrogen sealing step for sealing nitrogen into the refrigerant circuit of the outdoor unit 2. STEP 13 is provided in place of the refrigerant sealing step involved in the manufacturing step for an outdoor unit of an air-conditioning apparatus of the related art using R410A, which is designated refrigerant, and is a step of sealing nitrogen in place of the designated refrigerant.

That is, STEP 13 includes STEP 13A as a step of connecting a nitrogen sealing apparatus (not shown) to the outdoor unit 2, STEP 13B as a step of sealing nitrogen, and STEP 13C as a step of removing the nitrogen sealing apparatus from the outdoor unit 2.

In STEP 13A, the portions where the apparatus for sealing nitrogen are connected to the outdoor unit 2 may be selected similarly to the above-mentioned evacuation step (STEP 12B). One or a plurality of the manufacturing joints (couplers) mounted on the process pipe 21 mounted in the outdoor pipe 8 and on the extension pipe connection valves 13a and 13b of the outdoor unit 2 are selected as the connection portions in many cases.

The nitrogen sealing amount is an amount appropriate for the operation test in STEP 14B described later and capable of maintaining an inside of the refrigerant circuit of the outdoor unit 2 at an atmospheric pressure or more at the time of shipping the air-conditioning apparatus 100. The appropriate amount varies depending on the specifications of the outdoor unit 2 (internal volume of the refrigerant circuit mainly including the outdoor heat exchanger 5).

When the nitrogen sealing apparatus is removed from the outdoor unit 2 in STEP 13C, the manufacturing joints (couplers) are automatically brought into the closed state, and hence the sealed nitrogen is not leaked out of the refrigerant circuit of the outdoor unit 2.

(Test-Operation and Inspection Step)

STEP 14 is the test-operation and inspection step for performing the operation test for the outdoor unit 2 through use of nitrogen. STEP 14 includes STEP 14A as a step of connecting a test load apparatus (not shown) to the outdoor unit 2, STEP 14B as a step of performing the operation test for the outdoor unit 2, and STEP 14C as a step of removing the test load apparatus from the outdoor unit 2.

Note that, the test load apparatus is a simulated indoor unit to be used in place of the indoor unit 1 illustrated in FIG. 1, and may be a pipe connecting the flare joint 16a and the flare joint 16b.

In STEP 14A, the test load apparatus is connected to the above-mentioned manufacturing joints (couplers) mounted on the extension pipe connection valves 13a and 13b of the outdoor unit 2. The refrigerant circuit of the outdoor unit 2 and the refrigerant circuit of the test load apparatus are coupled to each other, to thereby form a continuous refrigerant circuit (circuit in which fluid can circulate).

Note that, manufacturing joints engageable with the manufacturing joints (couplers) mounted on the extension pipe connection valves 13a and 13b of the outdoor unit 2 (for example, when the manufacturing joints on the outdoor unit side are male manufacturing joints (inserting side), the manufacturing joints on the test load apparatus side are female manufacturing joints (inserted side)) are connected to portions of the test load apparatus to be connected to the outdoor unit 2. Similarly, the manufacturing joints are mounted or removed through one-touch operation. Further, under a state in which the manufacturing joints are mounted on the outdoor unit 2, the manufacturing joints are brought into an opened state to enable the operation test, whereas under a state in which the manufacturing joints are removed from the outdoor unit 2, the manufacturing joints are brought into a closed state to enable the vacuum state to be maintained in the refrigerant circuit of the test load apparatus.

In STEP 14B, there are performed test operation and inspection, in which the compressor 3, the four-way valve 4, the expansion valve 6, the outdoor air-sending device 5f, and other devices are operated to confirm, for example, whether or not those devices can be operated as the outdoor unit 2 and whether or not the operation current falls within a predetermined range.

Note that, when nitrogen is used as a working medium at the time of operation test, nitrogen is not subjected to phase transition such as condensation and evaporation to remain in a gas state. In this case, even under a state in which the passage of the expansion valve 6 is fully opened, the passage is smaller than those of the outdoor pipe 8 located at the front and back of the expansion valve 6, thereby causing a difference between the flow rate at the compressor 3 and the flow rate at the expansion valve 6. As a result, similarly to the operation using designated refrigerant, a pressure state differs before and after the compressor 3 and the expansion valve 6 serving as boundaries, the pressure can be set higher in the refrigerant circuit located on a side of the heat exchanger serving as a condenser (outdoor heat exchanger 5 side when the cooling operation is performed through the switching of the four-way valve 4), and can be set lower in the refrigerant circuit located on a side of the heat exchanger serving as an evaporator (test load apparatus side when the cooling operation is performed through the switching of the four-way valve 4).

Thus, when a pressure gauge (pressure sensor) is mounted to the service port 14b located at the liquid-side extension pipe connection valve 13b or to the test load apparatus and the four-way valve 4 is switched, it can be confirmed that the cooling operation or the heating operation can be performed.

Further, when the nitrogen sealing amount is set to an appropriate amount depending on the specifications of the outdoor unit 2, the pressure can be set not to exceed a design pressure of R32, which is designated refrigerant, and the high pressure and the low pressure at the time of operation test can be maintained within predetermined ranges. As a result, it is also possible to perform inspection of whether or not the operation current falls within the predetermined range. In STEP 14C taken after the operation test is finished, the test load apparatus is removed from the outdoor unit 2. The procedure is as follows. That is, in the final stage of the operation test, the four-way valve 4 is switched to perform the cooling operation, and the liquid-side extension pipe connection valve 13b of the outdoor unit 2 is closed. Then, the total amount of nitrogen in the refrigerant circuit is recovered (pumped down) into the refrigerant circuit of the outdoor unit 2 through the opened extension pipe connection valve 13a. After that, the gas-side extension pipe connection valve 13a is closed, and then the test load apparatus is removed.

(Final Assembling Step)

STEP 15 is the final assembling step for the outdoor unit 2. The manufacturing joints (couplers) mounted on the extension pipe connection valves 13a and 13b are removed, and the remainder of the components, such as the housing panels (not shown), are mounted, to thereby finish manufacturing the outdoor unit 2. After that, the process proceeds to the subsequent packaging step (STEP 2: see FIG. 2).

(Packaging Step to Transportation Step)

The air-conditioning apparatus 100 is assembled as described above, and hence the packaging step, the shipping step, the transportation step for transporting the air-conditioning apparatus 100 from the factory to a warehouse, the storage step for storing the air-conditioning apparatus 100 in the warehouse, and the transportation step for transporting the air-conditioning apparatus 100 from the warehouse to a use place where a user uses the air-conditioning apparatus 100 are executed under a state in which nitrogen is sealed into the refrigerant circuit of the outdoor unit 2 (STEP 2 to STEP 6: see FIG. 2).

(Actions and Effects)

In the method 200 of manufacturing a refrigeration cycle apparatus, designated refrigerant, which is flammable refrigerant, is never used but inert gas is used for the refrigerant circuit (outdoor pipe 8 or other components) of the outdoor unit 2, and hence the following actions and effects are attained.

(i) There is no need to take a step of sealing and recovering flammable refrigerant, thereby requiring no facilities, factory site, or building for taking this step. As a result, the investment amount and the manufacturing cost are reduced.

(ii) The air-conditioning apparatus 100 is shipped under a state in which inert gas is sealed, and hence there is no risk of fire even in the event of leakage during the steps of manufacturing, shipping, storing, and transporting the air-conditioning apparatus 100. Further, there is no risk of adverse effects to exacerbate global warming and ozone depletion.

(iii) Further, even when the air-conditioning apparatus 100 is shipped under a state in which inert gas is sealed in place of designated refrigerant, corrosion in the refrigerant circuit can be prevented during the steps of manufacturing, shipping, storing, and transporting the air-conditioning apparatus 100. As a result, the reliability of the apparatus can be maintained.

(iv) The operation test is performed under a state in which inert gas is sealed at the time of manufacturing the air-conditioning apparatus 100, and hence it is confirmed that the operation of the air-conditioning apparatus 100 has no trouble. As a result, the reliability of the apparatus is guaranteed.

Note that, the above-mentioned actions and effects are described by taking the air-conditioning apparatus 100 as an example, but the present invention is not limited thereto. The present invention may also be applied to a "method of manufacturing a separate-type refrigeration cycle apparatus" such as a showcase having a refrigerant circuit constructed by connecting a use-side unit corresponding to the indoor unit of the air-conditioning apparatus and the outdoor unit (heat source-side unit) through the extension pipes. In this case, actions and effects similar to those o he above can be attained.

[Embodiment 3]

Figure 4:
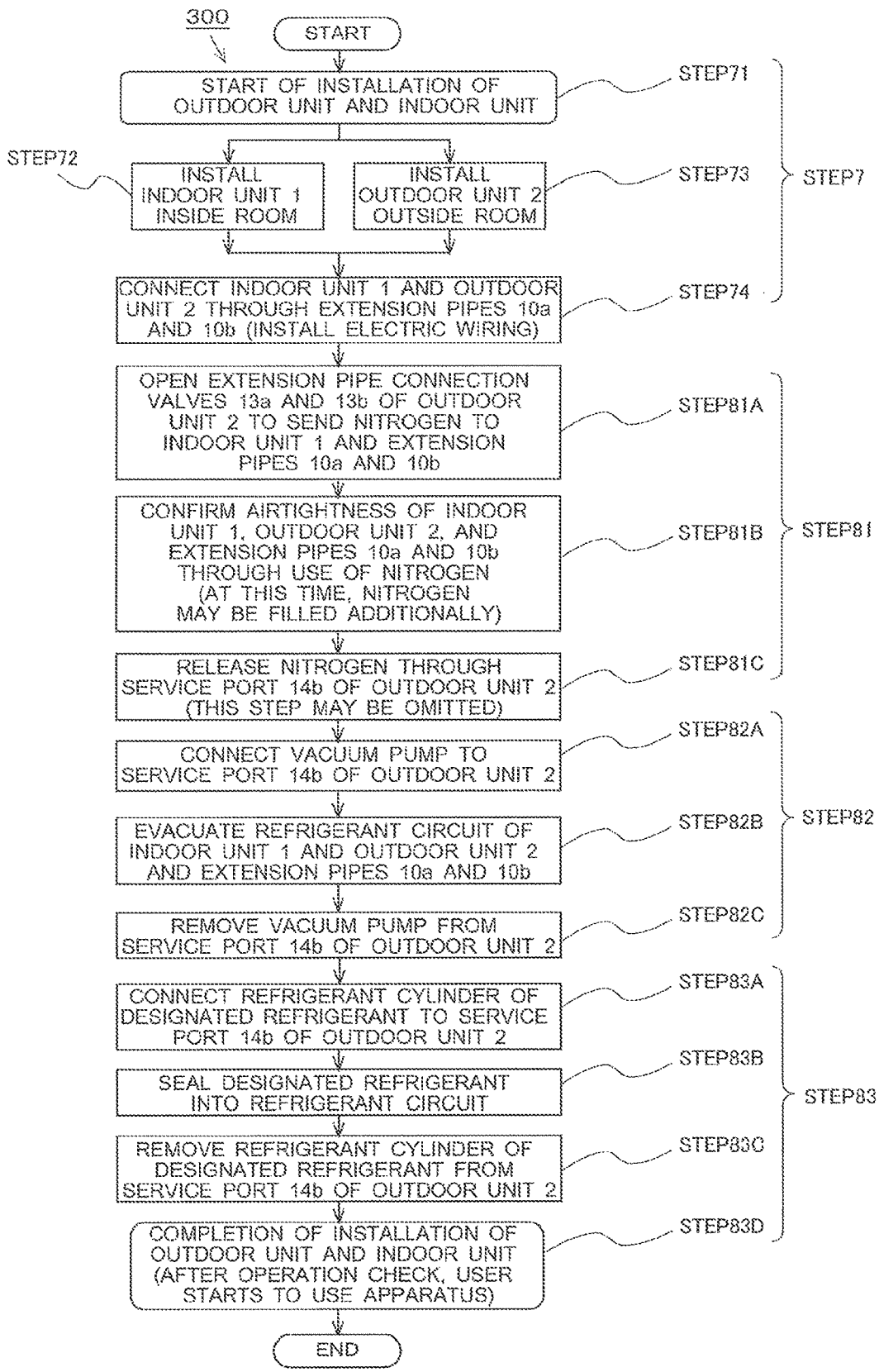
FIG. 4 is a flow chart illustrating a method of installing a refrigeration cycle apparatus (air-conditioning apparatus) according to Embodiment 3 of the present invention.

FIG. 4 is a flow chart illustrating a method of installing a refrigeration cycle apparatus according to Embodiment 3 of the present invention.

In FIG. 4, a method 300 of installing a refrigeration cycle apparatus includes the installation step (STEP 7: see FIG. 2) for installing the air-conditioning apparatus 100 (see Embodiment 1) at a use place where a user uses the air-conditioning apparatus 100 (identical with an installation place), and the operation check step (STEP 8: see FIG. 2), and detailed steps involved in the installation step and the operation check step are illustrated in FIG. 4.

That is, STEP 7 is the installation step for installing the indoor unit 1 and the outdoor unit 2 at places designated by the user, constructing the refrigerant circuit by connecting the extension pipes 10*a* and 10*b*, and installing necessary electric wiring.

Further, the operation check step (STEP 8) includes STEP 81 as an airtightness confirmation step for confirming the airtightness of each of the extension pipes through use of nitrogen, STEP 82 as an evacuation step to be taken before refrigerant is sealed into the refrigerant circuit, and STEP 83 as a refrigerant sealing step for sealing R32, which is designated refrigerant.

(Installation Step)

The installation step (STEP 7) is taken to complete the continuous refrigerant circuit (circuit in which fluid can circulate) of the air-conditioning apparatus 100 by connecting the indoor unit 1 and the outdoor unit 2 through use of the extension pipes 10*a* and 10*b* as illustrated in FIG. 1.

First, in STEP 71, installation work is started (for example, the air-conditioning apparatus 100 is unpackaged). In STEP 72, the indoor unit 1 is installed inside a room at a place designated by the user. In STEP 73, the outdoor unit 2 is installed outside the room at a place designated by the user. Then, in STEP 74, the extension pipes 10*a* and 10*b* are connected to complete the refrigerant circuit.

The extension pipes 10*a* and 10*b* are connected through use of the flare nuts (not shown) mounted on the flare joints 16*a* and 16*b* of the extension pipe connection valves 13*a* and 13*b* of the outdoor unit 2 and on the flare joints 15*a* and 15*b* of the indoor unit 1, Note that, in STEP 74, electrical work necessary to operate the air-conditioning apparatus 100 is executed in addition to the work of completing the refrigerant circuit.

(Airtightness Confirmation Step)

STEP 81 is the airtightness confirmation step for confirming the airtightness of each of the extension pipes. Nitrogen is sealed into the refrigerant circuit of the outdoor unit 2 at the time of shipping the air-conditioning apparatus 100 from the factory. Thus, it can be confirmed that the sealing of nitrogen is maintained (no leakage occurs) due to, for example, the fact that the internal pressure of the outdoor pipe 8 is positive pressure as a result of measurement.

On the other hand, it is necessary to confirm, before designated refrigerant is sealed or before the operation check (before the user starts to use the air-conditioning apparatus 100), that the flare joints 15*a*, 15*b*, 16*a*, and 16*b* serving as the connection portions to the indoor unit 1 and the outdoor unit 2 are airtight (no leakage occurs). Thus, in the method 300 of installing a refrigeration cycle apparatus, the nitrogen sealed at the time of shipping the outdoor unit 2 is used as it is to confirm the airtightness of the completed refrigerant circuit (to be described below in detail).

Note that, hitherto, there is adopted an airtightness confirmation method involving sealing nitrogen newly into the refrigerant circuit including the indoor unit 1 and the extension pipes 10*a* and 10*b*, adjusting the nitrogen sealing amount to raise the pressure of nitrogen up to a design pressure of the air-conditioning apparatus (that varies depending on designated refrigerant), and determining that no leakage occurs when the pressure is not dropped even after an elapse of a given period of time (for example, all day long). Thus, the work is cumbersome.

In STEP 81A, the extension pipe connection valves 13*a* and 13*b* of the outdoor unit 2 are opened to send the nitrogen sealed into the outdoor unit 2 to the indoor unit 1 and the extension pipes 10*a* and 10*b*.

Then, in STEP 81B, the airtightness is confirmed through use of the nitrogen released into the refrigerant circuit of the air-conditioning apparatus 100 (for example, it is confirmed that the internal pressure is not dropped even after an elapse of a predetermined period of time; identical with the airtightness test). Thus, through the use of the nitrogen sealed into the outdoor unit 2, the sealing work of nitrogen at the installation site is no longer necessary, or the amount of nitrogen to be sealed additionally can be minimized, thereby being capable of achieving simplification of work and resource saving.

Note that, when the pressure cannot be raised to the design pressure with the amount of the nitrogen sealed into the outdoor unit 2, nitrogen is additionally sealed at the installation site. In this case, the extension pipe connection valves 13a and 13b of the outdoor unit 2 are closed again, and a nitrogen cylinder is connected to the service port 14b of the liquid-side extension pipe connection valve 13b of the outdoor unit 2, to thereby additionally seal nitrogen into the refrigerant circuit of the air-conditioning apparatus 100.

Further, in STEP 810, the nitrogen in the refrigerant circuit of the air-conditioning apparatus 100 is released into the atmosphere. That is, a control valve that is one of the tools is connected to the service port 14b, and a valve core of the service port 14b is opened. Note that, the release of nitrogen in STEP 81C (removal of nitrogen from the refrigerant circuit of the air-conditioning apparatus 100) may also be performed in the evacuation step described later (STEP 82B), and may thus be omitted.

(Evacuation Step)

STEP 82 is the evacuation step to be taken before refrigerant is sealed into the refrigerant circuit. First, in STEP 82A, a vacuum pump is connected to the service port 14b of the liquid-side extension pipe connection valve 13b of the outdoor unit 2.

Then, in STEP 82B, the vacuum pump is actuated to evacuate the refrigerant circuit of the air-conditioning apparatus 100. To secure the reliability of the air-conditioning apparatus 100, in particular, to prevent failure of the compressor 3 along with deterioration of refrigerating machine oil, water as well as the nitrogen sealed into the refrigerant circuit needs to be removed sufficiently, and hence the evacuation needs to be performed at a sufficient level (for example, performed for one hour or more after the pressure reaches −101 kPa). Details of the evacuation are described in an installation manual of the air-conditioning apparatus 100.

Further, after the evacuation step (STEP 82B) is finished, in STEP 82C, the vacuum pump is removed from the service port 14b of the liquid-side extension pipe connection valve 13b of the outdoor unit 2.

As described above, the airtightness confirmation step for the air-conditioning apparatus 100 (STEP 81) is taken through use of the sealed nitrogen, and hence there is no risk of fire or environmental impact even in the event of nitrogen leakage.

(Refrigerant Sealing Step)

STEP 83 is the refrigerant sealing step for sealing R32, which is designated refrigerant. That is, in STEP 83A, a refrigerant cylinder is connected to the service port 14b of the liquid-side extension pipe connection valve 13b of the outdoor unit 2. In STEP 83B, a valve of the refrigerant cylinder is opened to seal the refrigerant of R32 into the refrigerant circuit of the air-conditioning apparatus 100. At this time, the refrigerant cylinder is placed on a scale so that the amount can be measured, and the refrigerant is sealed by an amount designated by the manufacturer (described in the installation manual).

After the refrigerant sealing is completed, in STEP 83C, the refrigerant cylinder is removed from the service port 14b of the liquid-side extension pipe connection valve 13b of the outdoor unit 2.

Note that, in some cases, the refrigerant cannot be sealed up to the designated amount in STEP 83B because a large amount of refrigerant is designated by the manufacturer. In those cases, a given amount of refrigerant is sealed and the valve of the refrigerant cylinder is temporarily closed in STEP 83B. Then, at the time of operation check in STEP 83D described later, the refrigerant is sealed up to the designated amount while the air-conditioning apparatus 100 is operated. After the sealing of the refrigerant up to the designated amount is completed, the refrigerant cylinder is removed from the service port 14b of the liquid-side extension pipe connection valve 13b of the outdoor unit 2.

As described above, in the method 300 of installing a refrigeration cycle apparatus, the refrigerant of R32 having flammability is handled only in STEP 8a Thus, only during this work step, the installation engineer is required to exercise caution so that no heat or flame is present in the vicinity of an outdoor work space in case of leakage of the designated refrigerant.

In STEP 83D, the installation of the indoor unit 1 and the outdoor unit 2 is completed, and hence the air-conditioning apparatus 100 is brought into an operable state. Thus, the installation engineer mounts pressure gauges to the service ports 14a and 14c of the outdoor unit 2 to confirm whether or not the operation pressure falls within a normal range. In this manner, the installation engineer confirms that the air-conditioning apparatus 100 is operated normally. Then, the installation engineer hands over the air-conditioning apparatus 100 to the user, and the user starts to use the air-conditioning apparatus 100.

(Actions and Effects)

According to the present invention, the air-conditioning apparatus 100 transported to an installation place is installed under a state in which nitrogen, which is inert gas, is sealed, and hence the following actions and effects are attained.

(i) The airtightness test for confirming the airtightness of the refrigerant circuit is performed through use of nitrogen sealed at the time of manufacturing the air-conditioning apparatus 100, thereby being capable of achieving reduction in load on the installation work and resource saving in the installation work.

(ii) The nitrogen gas is discharged after the confirmation of the airtightness of the refrigerant circuit, and then the evacuation is performed. After that, flammable refrigerant, which is designated refrigerant, is newly sealed. Thus, the refrigerant during the normal operation is a single designated refrigerant alone. Thus, the refrigerant to be recovered at the time of repairing or dismantling the air-conditioning apparatus 100 is not a mixture, and hence subsequent processing (such as destruction and recycling) can be executed properly and efficiently.

Note that, Embodiment 3 is described by taking the air-conditioning apparatus 100 as an example, but the present invention is not limited to the air-conditioning apparatus. Similar effects can be attained as long as the method is a "method of installing a separate-type refrigeration cycle apparatus" such as a showcase having a refrigerant circuit constructed by connecting a use-side unit corresponding to the indoor unit of the air-conditioning apparatus and the outdoor unit (heat source-side unit) through the extension pipes.

[Embodiment 4]

Figure 5:
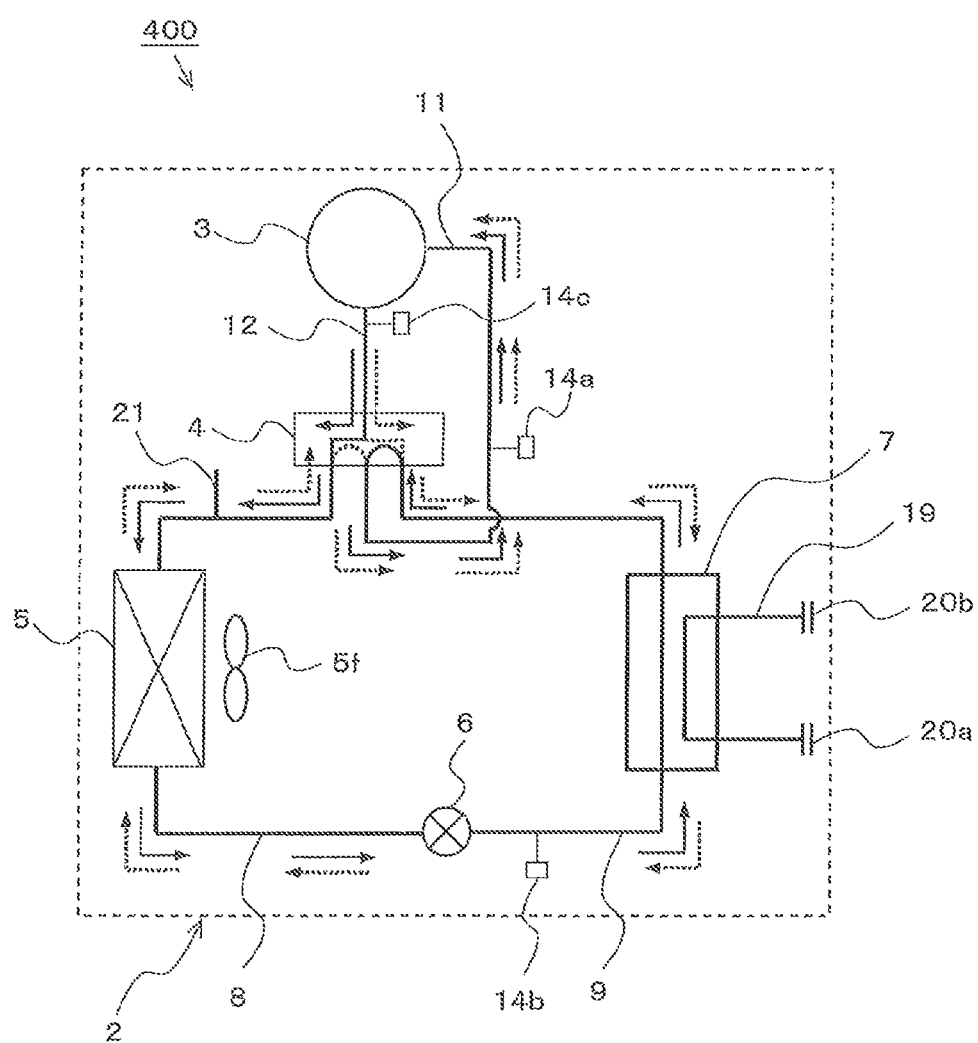
FIG. 5 is a refrigerant circuit diagram illustrating a configuration of a refrigerant circuit of a refrigeration cycle apparatus (hot water supply unit) according to Embodiment 4 of the present invention.

FIG. 5 is a diagram illustrating a refrigeration cycle apparatus according to Embodiment 4 of the present invention. Specifically, FIG. 5 is a refrigerant circuit diagram illustrating a configuration of a refrigerant circuit of a hot water supply unit serving as the refrigeration cycle apparatus. Note that, parts identical with or corresponding to those of Embodiment 1 are represented by the same reference symbols, and description thereof is partially omitted herein.

In FIG. 5, a refrigerant circuit of a hot water supply unit 400 is constructed integrally of the outdoor unit 2 (heat source side) and the indoor unit 1 (heat use side) of the air-conditioning apparatus 100. The refrigerant circuit corresponds to such a refrigerant circuit that the indoor pipe 9 is directly connected to the outdoor pipe 8 and the indoor heat exchanger 7 is included in the outdoor unit 2. Thus, the outdoor heat exchanger 5 may be referred to as "heat source-side heat exchanger"; the indoor heat exchanger 7, "use-side heat exchanger"; the outdoor pipe 8, "heat source-side pipe"; and the indoor pipe 9, "use-side pipe".

Further, in the use-side heat exchanger, heating energy (or cooling energy) is transferred from refrigerant to water flowing through a water pipe 19. Note that, the water pipe 19 has connection portions 20a and 20b for connection to a water circuit (not shown) of the hot water supply unit.

Further, similarly to the air-conditioning apparatus 100, inert gas (for example, nitrogen) is sealed into the refrigerant circuit (heat source-side pipe or other components) of the hot water supply unit 400, and an operation test is performed in this state in a factory. Then, the hot water supply unit 400 is shipped, stored, and transported in this state. Thus, the hot water supply unit 400 attains actions and effects similar to those of the air-conditioning apparatus 100.

Further, the hot water supply unit 400 can be manufactured in conformity with the method 200 of manufacturing a refrigeration cycle apparatus. Thus, actions and effects similar to those of the method 200 of manufacturing a refrigeration cycle apparatus can be attained by manufacturing the hot water supply unit 400 in conformity with the method 200 of manufacturing a refrigeration cycle apparatus.

Moreover, the hot water supply unit 400 can be installed in conformity with the method 300 of installing a refrigeration cycle apparatus (to be exact, the method does not include the connection step using the extension pipes 10a and 10b, but the airtightness test is performed through use of sealed inert gas (for example, nitrogen), then the evacuation is performed, and then designated refrigerant is sealed). Thus, actions and effects similar to those of the method 300 of installing a refrigeration cycle apparatus can be attained by installing the hot water supply unit 400 in conformity with the method 300 of installing a refrigeration cycle apparatus.

Note that, in this case, the airtightness test to be performed at an installation place may be performed in the factory.

Reference Signs List

| | |
|---|---|
| 1 | indoor unit |
| 2 | outdoor unit |
| 3 | compressor |
| 4 | four-way valve |
| 5 | outdoor heat exchanger (heat source-side heat exchanger) |
| 5f | outdoor air-sending device |
| 6 | expansion valve |
| 7 | indoor heat exchanger (use-side heat exchanger) |
| 7f | indoor air-sending device |
| 8 | outdoor pipe (heat source-side pipe) |
| 9 | indoor pipe (use-side pipe) |
| 10a | extension pipe |
| 10b | extension pipe |
| 11 | suction pipe |
| 12 | discharge pipe |
| 13a | extension pipe connection valve |
| 13b | extension pipe connection valve |
| 14a | service port |
| 14b | service port |
| 14c | service port |
| 15a | flare joint |
| 15b | flare joint |
| 16a | flare joint |
| 16b | flare joint |
| 19 | water pipe |
| 20a | connection portion |
| 20b | connection portion |
| 21 | process pipe |
| 100 | air-conditioning apparatus (Embodiment 1) |
| 200 | method of manufacturing a refrigeration cycle apparatus (Embodiment 2) |
| 300 | method of installing a refrigeration cycle apparatus (Embodiment 3) |
| 400 | hot water supply unit (Embodiment 4) |

The invention claimed is:

1. A method of manufacturing a refrigeration cycle apparatus for executing a refrigeration cycle using a refrigerant having flammability, the method comprising:
   sealing an inert gas into devices of the refrigeration cycle apparatus for executing the refrigeration cycle and a pipe connecting the devices in place of the refrigerant, the inert gas being selected from the group consisting of nitrogen, helium and argon;
   performing an operation test that includes executing the refrigeration cycle for the devices under a state in which the inert gas is sealed; and
   shipping the refrigeration cycle apparatus under the state in which the inert gas remains sealed.

2. The method of manufacturing a refrigeration cycle apparatus of claim 1,
   wherein the refrigeration cycle apparatus is a separate-type refrigeration cycle apparatus comprising an outdoor unit and an indoor unit connected to each other through extension pipes, and
   wherein the method comprises:
      sealing, in a factory, the inert gas into the devices for executing the refrigeration cycle and the pipe connecting the devices in place of the refrigerant, the devices and the pipe being mounted on the outdoor unit;
      performing the operation test that includes executing the refrigeration cycle for the devices under the state in which the inert gas is sealed; and
      shipping the refrigeration cycle apparatus under the state in which the inert gas remains sealed.

* * * * *